United States Patent
Dinh et al.

(10) Patent No.: US 10,470,178 B2
(45) Date of Patent: Nov. 5, 2019

(54) DEVICES FOR A WIRELESS NETWORK SYSTEM AND COMMUNICATION METHODS THEREOF

(71) Applicant: Samsung Electronics Co., Ltd., Gyeonggi-do (KR)

(72) Inventors: Nga Thi Thuy Dinh, Gyeonggi-do (KR); Sangsoon Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 15/439,566

(22) Filed: Feb. 22, 2017

(65) Prior Publication Data

US 2017/0332375 A1 Nov. 16, 2017

Related U.S. Application Data

(60) Provisional application No. 62/334,089, filed on May 10, 2016.

(30) Foreign Application Priority Data

Oct. 28, 2016 (KR) ........................ 10-2016-0141583

(51) Int. Cl.
  *H04W 72/04* (2009.01)
  *H04W 74/04* (2009.01)
(52) U.S. Cl.
  CPC ... *H04W 72/0446* (2013.01); *H04W 72/0486* (2013.01); *H04W 74/04* (2013.01)

(58) Field of Classification Search
  None
  See application file for complete search history.

(56) References Cited

U.S. PATENT DOCUMENTS

| 9,191,950 | B2 | 11/2015 | Lim et al. | |
|---|---|---|---|---|
| 2009/0016314 | A1* | 1/2009 | Kim | H04W 72/1257 370/345 |
| 2010/0124238 | A1* | 5/2010 | Hong | H04W 74/04 370/474 |
| 2012/0218928 | A1 | 8/2012 | Liu | |
| 2014/0126558 | A1* | 5/2014 | Kim | H04W 74/04 370/336 |

FOREIGN PATENT DOCUMENTS

| KR | 20120019951 | 3/2012 |
|---|---|---|
| KR | 101562782 | 10/2015 |

* cited by examiner

*Primary Examiner* — Jutai Kao
(74) *Attorney, Agent, or Firm* — The Farrell Law Firm, P.C.

(57) ABSTRACT

A data communication method of a hub device for a wireless communication system is provided. The method includes receiving guaranteed time slot (GTS) allocation requests including size information of data from a plurality of devices in operable communication with the hub device, determining a superframe order (SO) regarding the plurality of devices based on the size information of the data received therefrom, and allocating a GTS corresponding to the determined SO as a GTS of the plurality of devices.

17 Claims, 11 Drawing Sheets

US 10,470,178 B2

DEVICES FOR A WIRELESS NETWORK SYSTEM AND COMMUNICATION METHODS THEREOF

PRIORITY

This application claims priority under 35 U.S.C. § 119(e) to U.S. Provisional Application Ser. No. 62/334,089, which was filed in the U.S. Patent and Trademark Office on May 10, 2016, and under 35 U.S.C. § 119(a) to Korean Patent Application Serial No. 10-2016-0141583, which was filed in the Korean Intellectual Property Office on Oct. 28, 2016, the entire disclosure of each of these applications is incorporated herein by reference.

BACKGROUND

1. Field of the Disclosure

The present disclosure relates generally to devices for a wireless network system and communication methods thereof, and more particularly, to a data communication method for allocating a guaranteed time slot in a wireless network communication system and a device.

2. Description of the Related Art

Conventional wireless networks support technology in fields such as an Internet of things (IoT) construction industry, a home automation industry, an industrial automation industry, etc.

For example, the IoT construction technology enables electronic devices which are normally used in a smart home to communicate by transceiving data with each other, by being connected to a wireless personal area network (WPAN).

However, a hub device which plays a role as a coordinator among IoT devices constituting a smart home uses non-beacon IEEE 802.15.4. Therefore, the hub device using the non-beacon IEEE 802.15.4 has difficulty supporting high reliability, high bandwidth use, high throughput and low power consumption. Further, network coverage is limited and the number of terminal devices connected with the hub device is also limited because of poor performance of the hub device which uses a non-beacon mode.

Terminal devices connected with the hub device can provide quality of service (QoS) by using a guaranteed time slot (GTS) of a superframe. The hub device receives a GTS request command from a terminal device, allocates a GTS to the terminal device and receives a GTS deallocation command from the terminal device. However, even though the terminal device does not transceive data in an allocated time slot, time slot bandwidth of the GTS, which is allocated to the terminal device, and power are consumed before the hub device receives a GTS deallocation command from the terminal device in the GTS part of the superframe.

SUMMARY

An aspect of the present disclosure provides a hub device configured for use in a wireless network system and a data communication method for allocating a GTS which can enhance a function of a device and a device.

As aspect of the present disclosure provides a data communication method and a device for a GTS allocation which can enhance functions of devices for a wireless network system by amending an IEEE 802.15.4 communication standard to maintain compatibility according to the IEEE 802.15.4 wireless network standard.

In accordance with an aspect of the present disclosure, there is provided a data communication method of a hub device for a wireless communication system. The method includes receiving guaranteed time slot (GTS) allocation requests including size information of data from a plurality of devices in operable communication with the hub device, determining a superframe order (SO) regarding the plurality of devices based on the size information of the data received therefrom, and allocating a GTS corresponding to the determined SO as a GTS of the plurality of devices.

In accordance with an aspect of the present disclosure, there is provided a hub device for a wireless communication system. The hub device includes a communicator configured to transceive data with a plurality of devices and a processor configured to receive guaranteed time slot (GTS) allocation requests including size information of data from the plurality of devices, determine a superframe order (SO) regarding the plurality of devices based on the size information of the data received therefrom, and allocate a GTS corresponding to the determined SO as a GTS of the plurality of devices.

In accordance with an aspect of the present disclosure, there is provided a device for a wireless network system. The device includes a communicator configured to transceive data with a hub device and a processor configured to control the communicator to transmit a guaranteed time slot (GTS) allocation request including data size information to the hub device, receive GTS allocation information regarding the device from the hub device, determine a transceiving mode of the device based on the GTS allocation information and transceive data with the hub device based on the determined transceiving mode.

DETAILED DESCRIPTION

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

When an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, when an element (for example, a first element) is "directly coupled with/to" or "directly connected to" another element (for example, a second element), there is no intervening element (for example, a third element) between the element and another element.

"A hub device" may indicate "a coordinator" which controls devices that carry out wireless data communication with each other via a wireless communication network, and "a device" may indicate "a terminal device" which carries out wireless network communication with the coordinator and another device in the wireless communication network.

Hereinafter, electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

Figure 1A:
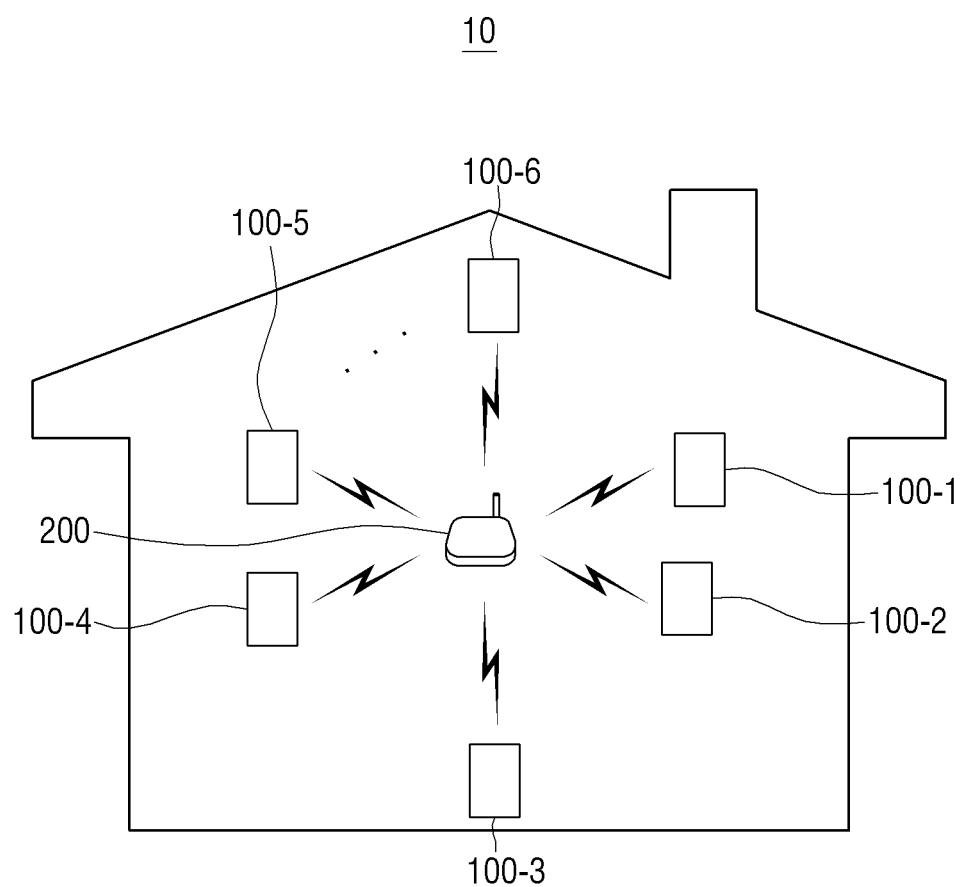
FIGS. 1A and 1B are diagrams of wireless network topologies that provide an IoT service, according to an embodiment of the present disclosure.
Figure 1B:
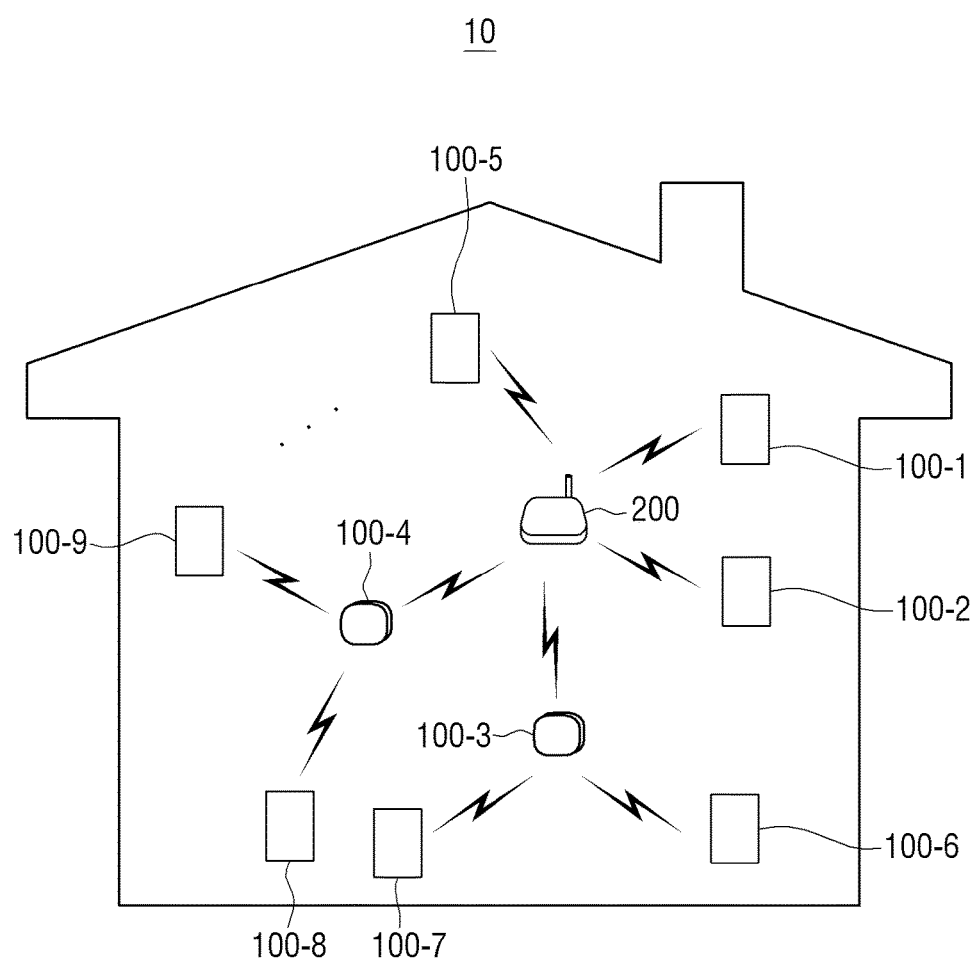

FIGS. 1A and 1B are diagrams of wireless network topologies that provide an IoT service, according to an embodiment of the present disclosure.

FIG. 1A illustrates a start network topology and FIG. 1B illustrates a tree network topology.

In a near-field wireless communication (NFC) such as a wireless personal area network (WPAN) or a wireless local area network (LAN), devices 100-1, 100-2, 100-3, 100-4, 100-5, and 100-6 and a hub device 200 execute a data communication by using a time concept which is called superframe.

Referring to FIG. 1A, in a star network topology, the hub device 200 communicates with the plurality of devices 100-1, 100-2, 100-3, 100-4, 100-5, and 100-6 in a smart home 10. The hub device 200 is one of full function devices (FFDs), transmits a beacon signal, and manages and controls the other devices 100-1, 100-2, 100-3, 100-4, 100-5, and 100-6, which are reduced function devices (RFDs).

Referring to FIG. 1B, in the tree network topology, the hub device 200 which is the FFD may communicate with the plurality of devices 100-1, 100-2, 100-3, 100-4, 100-5, 100-6, 100-7, 100-8, and 100-9, which are RFDs. Each of the devices 100-1, 100-2, 100-3, 100-4, 100-5, 100-6, 100-7, 100-8, and 100-9 may communicate with any different device in the network. Therefore, the tree (peer to peer) topology may constitute a complicated network, and the tree topology has high data reliability and a high connection recognition rate.

For example, the hub device 200 may be a coordinator device which processes resources of a device in a wireless network system, and the hub device 200 may be connected with a smart sensor, a light, a lock, a camera, etc. via a wireless network in a smart home.

The devices 100-1, 100-2, 100-3, 100-4, 100-5, 100-6, 100-7, 100-8, and 100-9 may be terminal devices or devices including sensors which are connected with the hub device 200 via a wireless network. For example, the device may be a door, to which sensors for monitoring a door opening or door closing are attached, a window, a cabinet or a garage. In addition, the device may be a device with a sensor which monitors a movement of an object or a user in a home. Further, the device may be an outlet which controls an electronic apparatus. The devices may be many devices that communicate with the hub device 200 wirelessly on a wireless network.

Existing devices constituting a smart home form a star network topology. As a range of IoT use increases, a smart home may be built through a tree network topology. Network coverage of the star network topology may be more limited than network coverage of the tree network topology. Further, devices constituting the tree topology network may transceive larger amounts of data than devices constituting the star topology network.

A superframe configuration of IEEE 802.15.4 can be determined by the hub device 200. A resource of a device is not considered in a GTS allocation of a superframe of the current IEEE 802.15.4. Accordingly, an amendment can be carried on the IEEE 802.15.4 standard so that a resource of a device may be reflected in allocating a GTS of the superframe and the GTS allocation can be applied to the tree topology. A modification of the IEEE 802.15.4 will be described with reference to FIGS. 4 to 10.

Figure 2:
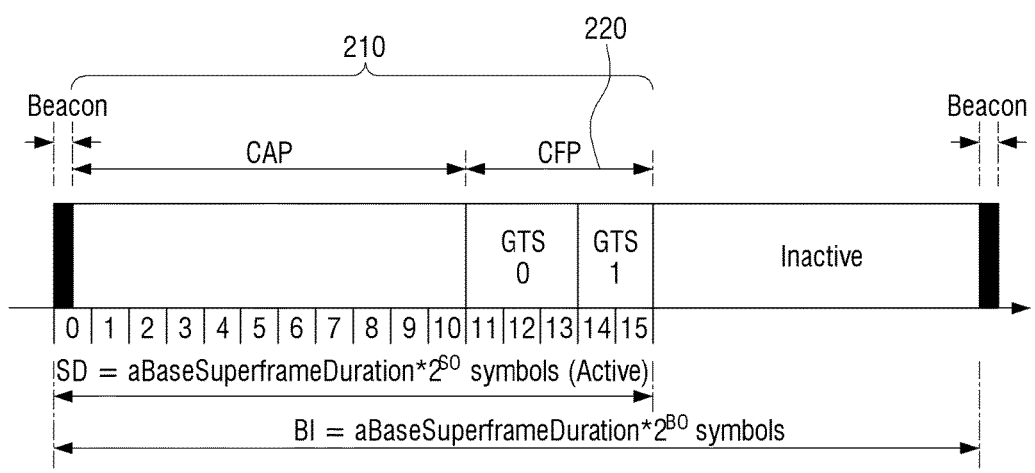
FIG. 2 is a diagram of a superframe configuration used in an IEEE 802.15.4 system, according to an embodiment of the present disclosure.

FIG. 2 is a diagram of a configuration of a superframe that is used in an IEEE 802.15.4 system, according to an embodiment of the present disclosure.

Referring to FIG. 2, a superframe configuration is determined by a hub device, and superframe information is notified/transmitted to a device by a beacon signal. The device that receives the beacon signal is synchronized with a near-field wireless network.

An interval between a beacon signal and another beacon signal is divided into an active part and an inactive part. A beacon signal includes a superframe order (SO) value and a beacon order (BO) value which determine a configuration of a superframe. The SO and BO is determined by the hub device 200. For example, if there is too much data to transmit, large values are granted as the SO value and the BO value, and for traffic in real time, a small value may be granted as the BO value.

After receiving a beacon signal, the device determines a beacon interval (BI) between beacon signals by the BO value and determines an active part or superframe duration (SD) by the SO value.

The SD 210 is the length of the active part which includes 16 slots that have the identical interval. In the active part 210, a device competes with another device. The active part 210 includes a contention access period (CAP) in which a communication is carried out in a carrier sense multiple access/collision avoidance (GSMA/CA) algorithm method and a contention free period (CFP) 220 which includes GTSs which are allocated as a part of the superframe from the hub device for a real time communication or a communication requesting certain bandwidth.

A GTS allocation is carried out when the device requests the hub device for the GTS allocation, and in order to stop using the GTS, the device requests a GTS deallocation. The hub device 200 may determine to what device each GTS of a CFP is allocated. The GTS may be constituted with seven time slots at the maximum. In addition, a plurality of GTSs may be allocated to one device. Once the device is allocated with a GTS, unless the device requests for a deallocation of the GTS, other devices cannot use the GTS. Further, a GTS deallocation may be carried out by the hub device without any request from the device under a predetermined rule.

The SD 210 is an active part in which data is transceived between the device 100 and the hub device 200, and as the SO increases, the length of the SD is extended. SD=aBaseSuperfiameDuration*$2^{SO}$ and 0=<SO=<BO (Beacon order)=<14. When SD=14, an inactive part does not exist in the superframe. A left part in the SD 210 after the GTS allocation is used as the CAP. Therefore, the GTS allocation and use of a GTS in the SD 210 determine a superframe and also affect a beacon interval (BI). In the BI, devices are in an active state in the active part to receive a beacon signal and maintain a sleep mode in the inactive part.

In the superframe configuration according to the IEEE 802.15.4 standard, as the SO increases, an SD value increases. An increase of SD value indicates that bandwidth which can be provided to per slot increases. Therefore, the bandwidth may be wasted by allocating resources greater than a device requests the bandwidth as the SO increases. For example, if a size or amount of data (a resource) that a device to transmit is small, but an SO that the device requested a GTS has a high value, an SD value may be greater than the bandwidth required by the device, by the high value. Further, it is necessary for the device to be operated in an active mode in the CAP part and a GTS part which is allocated to the device. Therefore, power of the device may be inefficiently consumed.

Figure 3:
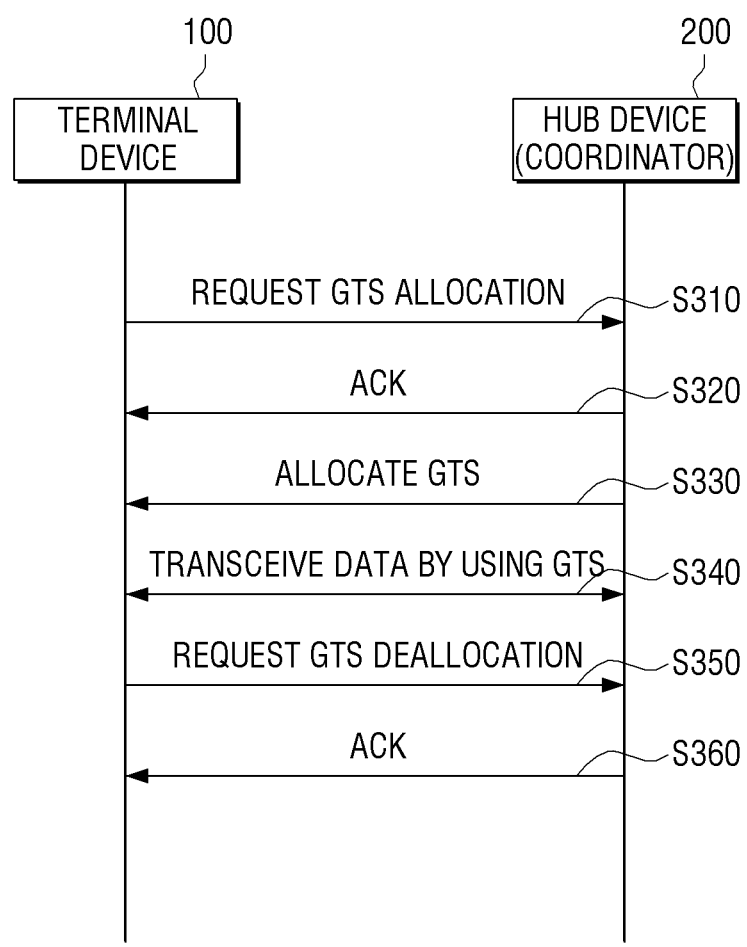
FIG. 3 is a signaling diagram of a process of data communication according to a GTS allocation between a hub device and a terminal device in the IEEE 802.15.4 system, according to an embodiment of the present disclosure.

FIG. 3 is illustrating signaling diagram of a process of data communication according to a GTS allocation between a hub device and a terminal device in the IEEE 802.15.4 system, according to an embodiment of the present disclosure.

In step S310, if there is data to be transmitted to the hub device 200, the terminal device 100 may request a GTS allocation by transmitting a message including a GTS request command to the hub device 200. The GTS allocation request command is transmitted to the hub device 200 through a message included in a GTS characteristics field.

In step S320, if a GTS allocation to the terminal device is determined, the hub device 200 transmits an acknowledgement (ACK) to the terminal device 100.

In step S330, the hub device 200 includes information about the GTS allocated to the device in a beacon message and transmits the beacon message to the terminal device 100.

In step S340, the terminal device 100 transceives data with other devices including the hub device 200 based on the beacon message received from the hub device 200 by using the allocated GTS.

In step S350, if the terminal device 100 is not to use the allocated GTS further, the terminal device 100 transmits a GTS deallocation request command to the hub device 200.

A "GTS request command" which is a request for GTS allocation, includes the GTS allocation request command of step S310 and the GTS deallocation request command of step S350.

In step S360, the hub device 200 deallocates the allocated GTS from the terminal device 100 and transmits an ACK to the terminal device 100.

Therefore, even when the GTS allocated to the terminal device 100 is not used, the allocated GTS cannot be used by other terminal devices until the terminal device 100 requests a deallocation of the GTS.

Figure 4:
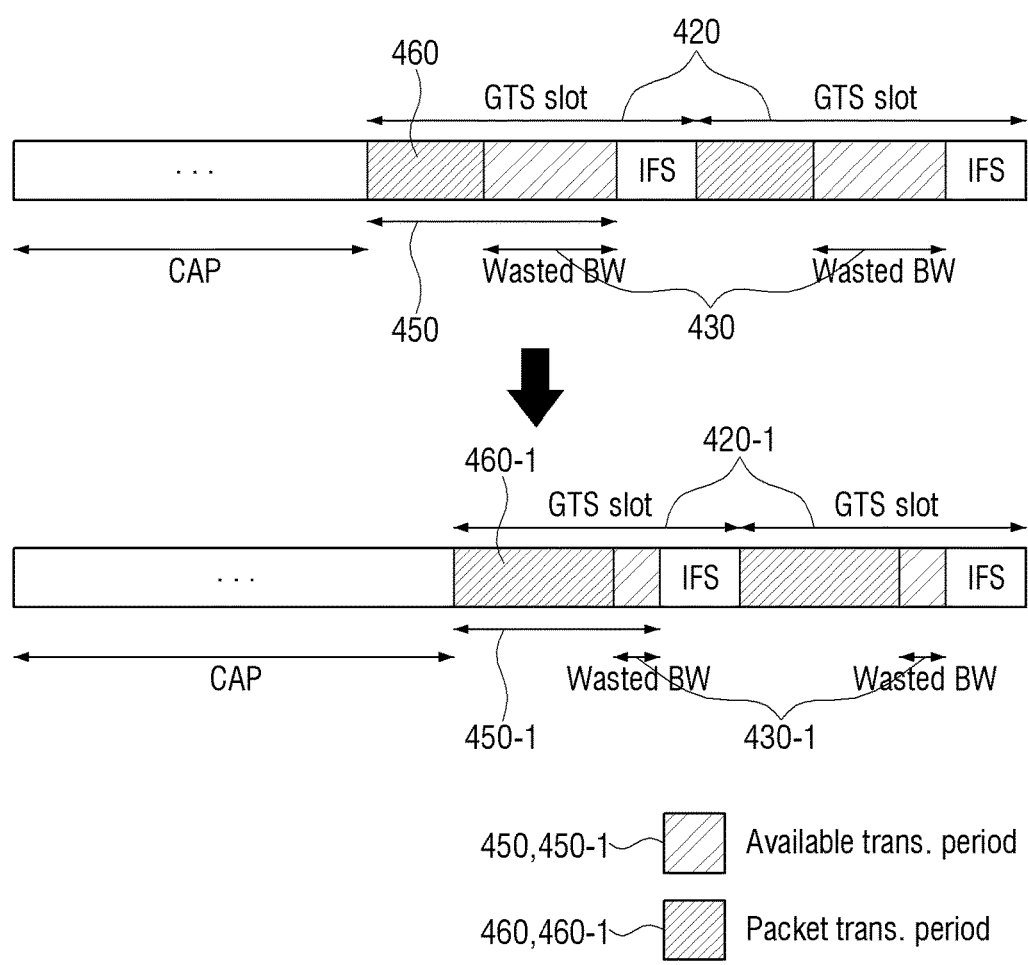
FIG. 4 is a diagram of a method of decreasing waste of GTS bandwidth, according to an embodiment of the present disclosure.

FIG. 4 is a diagram of a method of decreasing waste of GTS bandwidth, according to an embodiment of the present disclosure.

FIG. 4 illustrates CAP and CFP which pertain to an active part of the superframe illustrated in FIG. 2. Even though FIG. 4 illustrates two GTSs 420 in the CFP part, the CFP part in the IEEE 802.15.4 communication standard can include a maximum of seven GTSs 420.

The GTS slots 420 and 420-1 include data transmission available periods (available transmission periods) 450 and 450-1 and an interframe space (IFS). Time slots 430 and 430-1 are periods are what the data transmission available periods 450 and 450-1 are subtracted by the periods in which actual data was transmitted (packet transmission periods) 460, 460-1. The time slots 430 and 430-1 indicate wasted bandwidths 430 and 430-1 that are not used in the data transmission.

The upper (or top) view in FIG. 4 illustrates an active part which shows that when an SO=6, each GTS is allocated to two terminal devices. For example, each of the terminal devices may plan to transmit a packet of 90 bytes to a hub device. When an SO is six (SO=6), each GTS length 420 is 3.84 ms, an IFS is 0.64 ms and time required in transmitting each packet to each terminal device may be 1.6 ms including the IFS (0.64 ms). Therefore, according to a data transmission method according to an existing GTS allocation, a terminal device may waste the bandwidth of 2.24 ms (430)=3.84 ms (420)−1.6 ms (460), which is 58% of GTS length 420 of 3.84 ms allocated to the terminal device.

The lower (or bottom) view in FIG. 4 illustrates an active part which shows that, GTSs are allocated by an optimal SO which is determined based on a size of data that the terminal device is to transmit according to an embodiment.

If a terminal device is to transmit 90 bytes of data to a hub device, the hub device may determine an optimal GTS length which is required to transmit 90 bytes of data. The hub device may determine an SO value corresponding to the GTS required to transmit the 90 bytes of data. For example, when SO=1, the 90 bytes of data may be transmitted in a GTS part. Therefore, the hub device may allocate the length of the GTS part when SO=1 to each device. The length after the lengths of GTS part of the CFP that are determined becomes a CAP part in the active part of the superframe. Therefore, since the GTS part length corresponding to the 90 bytes of data has been shorted to the length when the SO value is 1, the length of the CAP part may become longer than the upper view in FIG. 4. In addition, when SO=1, the GTS length 420-1 may be 1.92 ms. Since the time taken to transmit the 90 bytes of data to the hub device is 1.6 ms, the bandwidth wasted in the GTS part may be 0.32 ms (430-1), i.e., 1.92 ms (420-1)–1.6 ms (460-1)=0.32 ms (430-1). Therefore, when a GTS is allocated, the bandwidth waste of the terminal device may be 17% of the GTS length 420-1. The data size and times only pertain to embodiments to explain the disclosure and it is not limited thereto.

Figure 5:
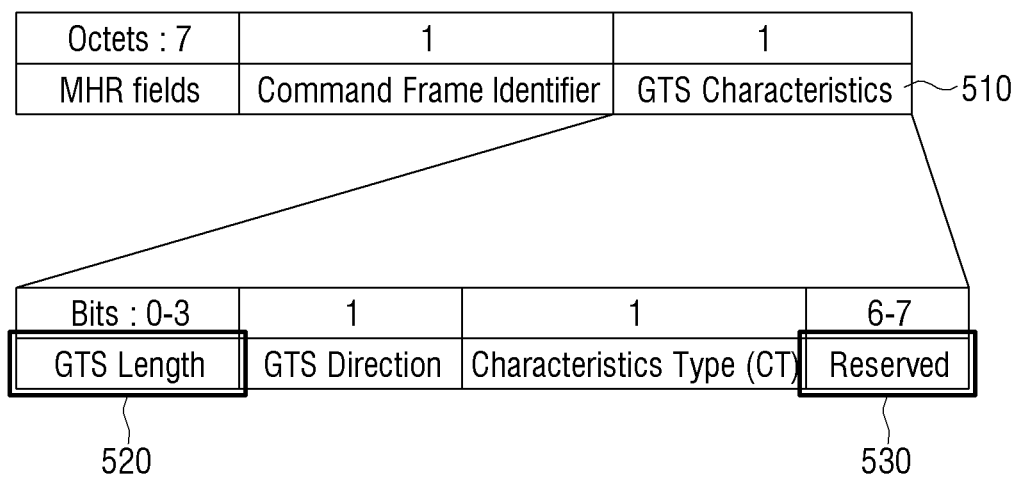
FIG. 5 is a diagram of a GTS allocation request command frame of IEEE 802.15.4, according to an embodiment of the present disclosure.

FIG. 5 is a diagram of a GTS request command frame of IEEE 802.15.4, according to an embodiment of the present disclosure.

Referring to FIG. 5, the GTS request command in the IEEE 802.15.4 communication standard includes a GTS characteristics field 510. The GTS characteristics field 510 includes characteristics and features of the GTS requested from the device 100 to the hub device 200. The GTS characteristics field 510 includes the GTS length field, a GTS direction field, a characteristics type field and a reserved field.

The GTS length field indicates how many superframe slots should be included in the GTS. The GTS direction field indicates whether the GTS is used for a receiving purpose or a transmitting purpose by a device. The characteristics type field indicates whether the GTS request command is used for a GTS allocation or a GTS deallocation.

Information about a size of data (packet) that the device 100 is to transmit to the hub device 200 may be transmitted to the hub device 200 as a GTS request command by being included in the GTS length field 520 of four bits and a reserved field 530 of 2 bits.

For example, if a size of data that the device 100 is to transmit is 20 bytes or greater than 20 bytes but less than 133 bytes, the data size information may be included in the GTS length field 520 that has a value of four bits. The data size field 520 that has the value of four bits may be applied in a star topology network. In addition, if a data size that the device 100 is to transmit is 133 bytes or greater than 133 bytes and less than 516 bytes, the data size information may be included in the reserved field 530 that has a value of two bits. In other words, the reserved field 530 of the GTS characteristics field 510 may indicate a sub field including information about a data size which is a pre-set size or greater than the pre-set size. The data size field 530 having a value of two bits may be applied in a tree topology network. Data sizes included in the data size fields 510, 530 may be configured as shown as below in Table 1.

TABLE 1

Method for Modification of GTS Request Command

| Total Data size (bytes) | Bits: 0-3 | Bits: 6-7 |
|---|---|---|
| 20-26 | 0000 | 00 |
| 27-33 | 0001 | 00 |
| 34-40 | 0010 | 00 |
| 41-47 | 0011 | 00 |
| 48-54 | 0100 | 00 |
| 55-61 | 0101 | 00 |
| 62-68 | 0110 | 00 |
| 69-75 | 0111 | 00 |
| 76-82 | 1000 | 00 |
| 83-89 | 1001 | 00 |

TABLE 1-continued

Method for Modification of GTS Request Command

| Total Data size (bytes) | Bits: 0-3 | Bits: 6-7 |
|---|---|---|
| 90-96 | 1010 | 00 |
| 97-103 | 1011 | 00 |
| 104-111 | 1100 | 00 |
| 112-119 | 1101 | 00 |
| 119-126 | 1110 | 00 |
| 127-133 | 1111 | 00 |
| 133-140 | 0000 | 01 |
| 141148 | 0001 | 01 |
| 149-156 | 0010 | 01 |
| 157-164 | 0011 | 01 |
| 165-172 | 0100 | 01 |
| 173-180 | 0101 | 01 |
| 181-188 | 0110 | 01 |
| 189-196 | 0111 | 01 |
| 197-204 | 1000 | 01 |
| 205-212 | 1001 | 01 |
| 213-220 | 1010 | 01 |
| 221-228 | 1011 | 01 |
| 229-236 | 1100 | 01 |
| 237-244 | 1101 | 01 |
| 245-252 | 1110 | 01 |
| 253-260 | 1111 | 01 |
| 261-268 | 0000 | 10 |
| 269-276 | 0001 | 10 |
| 277-284 | 0010 | 10 |
| 285-292 | 0011 | 10 |
| 293-300 | 0100 | 10 |
| 301-308 | 0101 | 10 |
| 309-316 | 0110 | 10 |
| 317-324 | 0111 | 10 |
| 325-332 | 1000 | 10 |
| 333-340 | 1001 | 10 |
| 341-348 | 1010 | 10 |
| 349-356 | 1011 | 10 |
| 357-364 | 1100 | 10 |
| 365-372 | 1101 | 10 |
| 373-380 | 1110 | 10 |
| 381-388 | 1111 | 10 |
| 389-396 | 0000 | 11 |
| 397-404 | 0001 | 11 |
| 405-412 | 0010 | 11 |
| 413-420 | 0011 | 11 |
| 421-428 | 0100 | 11 |
| 429-436 | 0101 | 11 |
| 437-444 | 0110 | 11 |
| 445-452 | 0111 | 11 |
| 453-460 | 1000 | 11 |
| 461-468 | 1001 | 11 |
| 469-476 | 1010 | 11 |
| 477-484 | 1011 | 11 |
| 485-492 | 1100 | 11 |
| 493-500 | 1101 | 11 |
| 501-508 | 1110 | 11 |
| 509-516 | 1111 | 11 |

Figure 6:
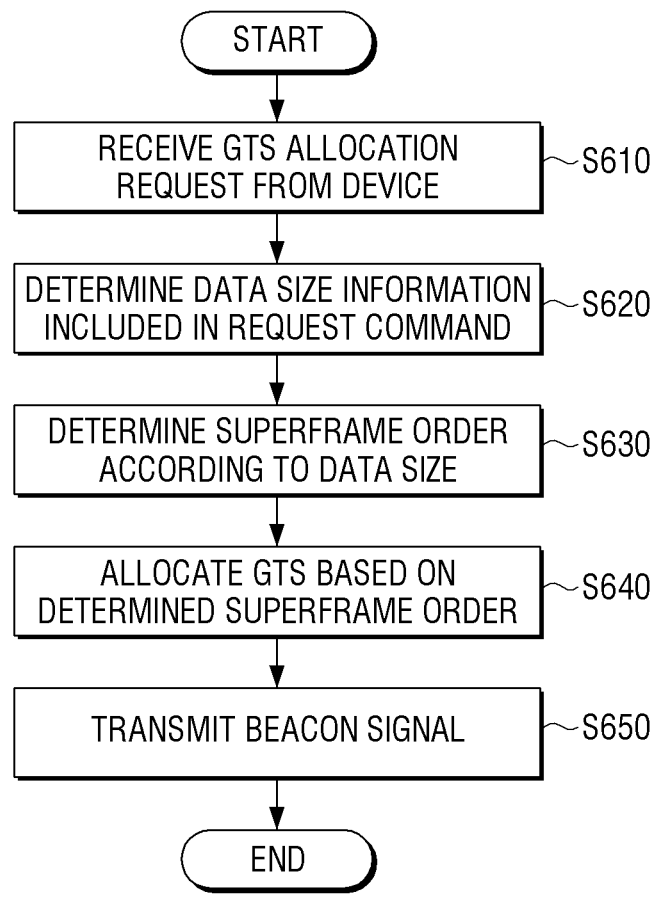
FIG. 6 is a flowchart of a GTS allocation method of a hub device, according to an embodiment of the present disclosure.

FIG. 6 is a flowchart of a GTS allocation method of a hub device, according to an embodiment of the present disclosure.

In step S610, the hub device 200 may receive a GTS request from the device 100 in the CAP part illustrated in FIG. 2. The GTS request may include a GTS allocation request or a GTS deallocation request. The device 100 may transmit a GTS request command including information about a size of data that the device 100 is to transmit to the hub device 200, to the hub device 200.

The hub device 200 may receive a GTS request from at least one device 100. The hub device 200 may receive GTS requests from a plurality of devices. If a GTS deallocation request is included among GTS request commands received from the plurality of device, the hub device 200 may first operate a GTS deallocation. The hub device 200 may proceed with rest steps after operating the GTS deallocation.

In step S620, the hub device 200 may determine a data size of the device included in the GTS request command. Information about the data size included in the GTS request command, as described the above with reference with FIG. 5, may be included in the data size field of 4 bits if the data size is less than a first value that is pre-set and may be included in the data size field of 2 bits if the data size is the pre-set first value or greater than the pre-set first value.

In step S630, the hub device 200 may determine an SO according to the information about the data size included in the GTS request command. The hub device 200 may determine an SO which has the slot length of an optimal GTS for transmitting the data size.

If GTSs of a superframe whose number is less than a pre-set number are allocated, the hub device 200 may determine a size of data according to a GTS request of the device 100. For example, in the IEEE 802.15.4 communication standard, the hub device 200 may allocate a maximum of seven GTSs to the device 100. Therefore, if seven GTSs or less than seven GTSs are not allocated among seven GTSs, the hub device 200 may perform operation S630. In other words, if all of the seven GTSs are allocated and the hub device 200 receives a GTS request from the device 100, the hub device 200 may transmit an ACK which is not accepting a GTS request of the device 100, to the device 100.

The hub device 200 may determine a period of time that is required for data which is the size of the data included in a GTS request command to be transmitted to the hub device 200. The hub device 200 may determine data arrival time by using data size information, a GTS allocation delay time, a GTS request arrival time and a packet generation rate of data. The packet generation rate of the data may indicate a rate that data having a size of the data size that the device 100 is to transmit become a packet. The GTS allocation delay time may include a delay time such as the IFS illustrated in FIG. 4. The hub device 200 may determine time required for data which is a size of the data that the device 100 is to transmit by using various data and methods.

When the device transmits a size of the data that the device is to transmit, the hub device 200 may determine an optimal SO that is required for the transmission of the data of the size by using an efficiency of power consumption, allocation delay efficiency, bandwidth use efficiency and throughput efficiency of the hub device 200.

The power consumption efficiency may be a value which is consumption power divided by the power consumed according to the IEEE 802.15.4 standard. The allocation delay efficiency may be a value which is a GTS allocation delay time divided by a GTS allocation delay time according to the IEEE 802.15.4 standard. The bandwidth use efficiency may be a value which is use amount of the bandwidth divided by an amount of the entire bandwidth. The throughput efficiency may be a value which is throughput divided by maximum throughput.

For example, if two devices are connected with the hub device 200 and GTSs are allocated to the two devices, a 2 ms delay time may occur. However, if seven devices are connected with the hub device 200 and seven devices are respectively allocated with GTSs, 20 ms delay time may occur. Therefore, based on the number of devices which are connected with the hub device 200 and bandwidth use efficiency and throughput according to a data size of each device, the hub device 200 may determine an optimal SO which is proper to a GTS requested by each device.

In step S640, the hub device 200 may allocate a GTS to the device 100 based on the determined SO.

If data arrival time of the device 100 is shorter or the same as the total time of a slot which is not allocated among GTSs, the hub device 200 may allocate a GTS to the device 100.

In step S650, the hub device 200 may transmit a beacon signal including GTS allocation information to the device 100.

For example, a current SO may be six (SO=6), a data size that a first device is to transmit may be 90 bytes and a data size that a second device is to transmit may be 120 bytes. Data size information of the first device and data size information of the second device may be included in a data size field of four bits which is a sub field of a GTS characteristics field and be transmitted to the hub device 200 as a GTS request command.

The hub device 200 may determine time that each piece of data arrives at the hub device 200 based on respective data size information of the first device and the second device and may determine an optimal SO according to a size of each data piece. The hub device 200 may allocate the length of a GTS slot which is equivalent to an optimal SO corresponding to 90 bytes of the first device, to the first device and allocate the length of a GTS equivalent to an optimal SO corresponding to 120 bytes of the second device, to the second device. The hub device 200 may transmit a beacon signal including information about a GTS allocated to each of the devices, to each of the devices. Each device may transceive data in the allocated GTS part based on the beacon signal received from the hub device 200.

Figure 7:
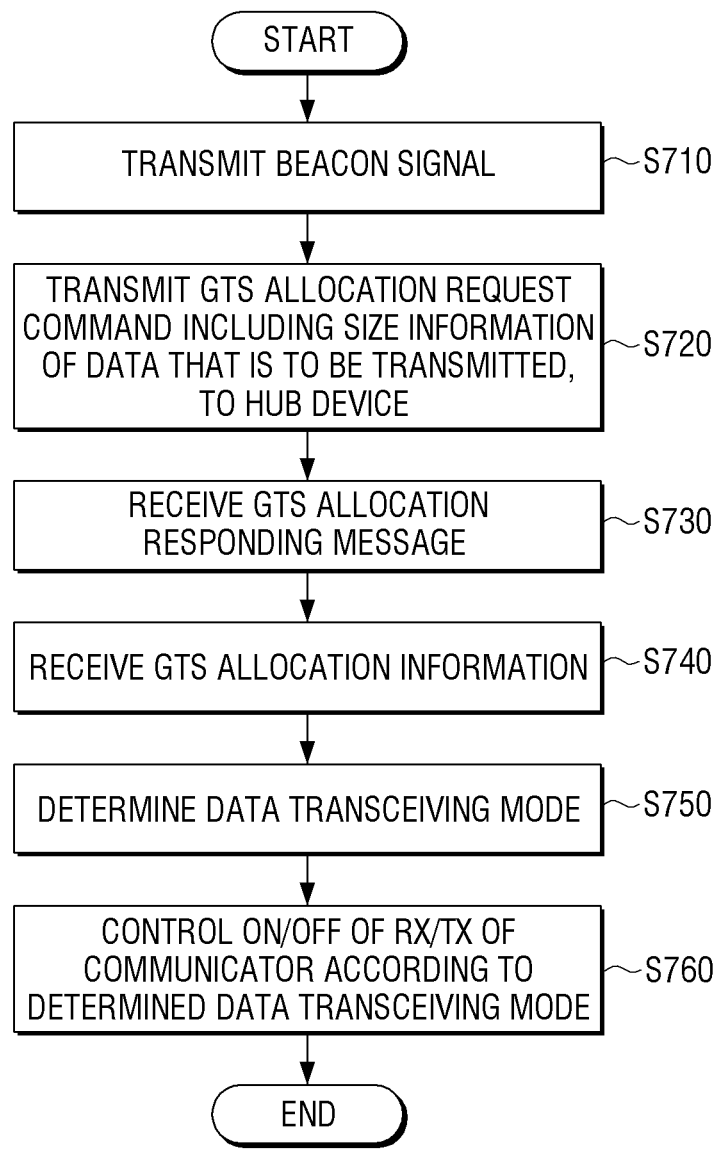
FIG. 7 is a flowchart of a data communication method according to a GTS allocation request of a terminal device, according to an embodiment of the present disclosure.

FIG. 7 is a flowchart of a data communication method according to a GTS allocation request of a device that is a terminal device, according to an embodiment of the present disclosure.

In step S710, the device 100 may receive a beacon signal notifying a start of a superframe, from the hub device 200.

In step S720, the device 100 may transmit a GTS request command including size information of data that the device 100 is to transmit to the hub device 200, to the hub device 200.

The GTS request may include a GTS allocation request or a GTS deallocation request. If a GTS request is a GTS deallocation request, the device 100 may not transmit information about a data size. The data size information may be included in the size information field 520 of four bits and the data size field 530 of 2 bits among the GTS characteristics fields illustrated in FIG. 5. If a data size is smaller than a pre-set value, data size information may be included in the size information field 520 of four bits and a GTS request may be transmitted to the hub device 200. If the data size is greater than or equal to the pre-set value, the data size information may be included in the size information field 530 and a GTS request may be transmitted to the hub device 200.

In step S730, the device 100 may receive a GTS allocation ACK message from the hub device 200.

In step S740, the device 100 may receive a beacon signal including GTS allocation information from the hub device 200.

In step S750, the device 100 may determine a data transceiving mode to transceive data in an allocated GTS. The GTS direction field illustrated in FIG. 5 indicates whether a GTS allocated to the device 100 is used for a receiving purpose or for a transmitting purpose.

If the device 100 receives data from the hub device 200 in the allocated GTS part, the device 100 may determine a receiving mode which is a first mode as the transceiving mode. If data is transmitted to the hub device 200 in the allocated time slot, the device 100 may determine a transmitting mode which is a second mode as the transceiving mode.

In step S760, the device 100 may control on/off of the RX and TX of the communicator according to a determined data transceiving mode.

In the receiving move which is the first mode, the device 100 may control the communicator to turn on a radio frequency (RF) receiver (RX) and turn off an RF transmitter (TX) included in the device 100 in the allocated time slot. In the transmitting mode, which is the second mode, the device 100 may control the communicator to turn on the TX and turn off the RX of the communicator of the device 100 in the allocated time slot.

Therefore, power consumed in the device 100 may be decreased because the RX and the TX of the communicator are not turned on at the same time in an allocated GTS part.

Herein, "on" and "off" may indicate turning on or turning off an RF transceiver built in the device 100 or an RF transceiver of a sensor attached to the device 100. When the device 100 communicates with the hub device 200, controlling on/off of the device 100 for communication power control may be carried out by another chip.

Figure 8:
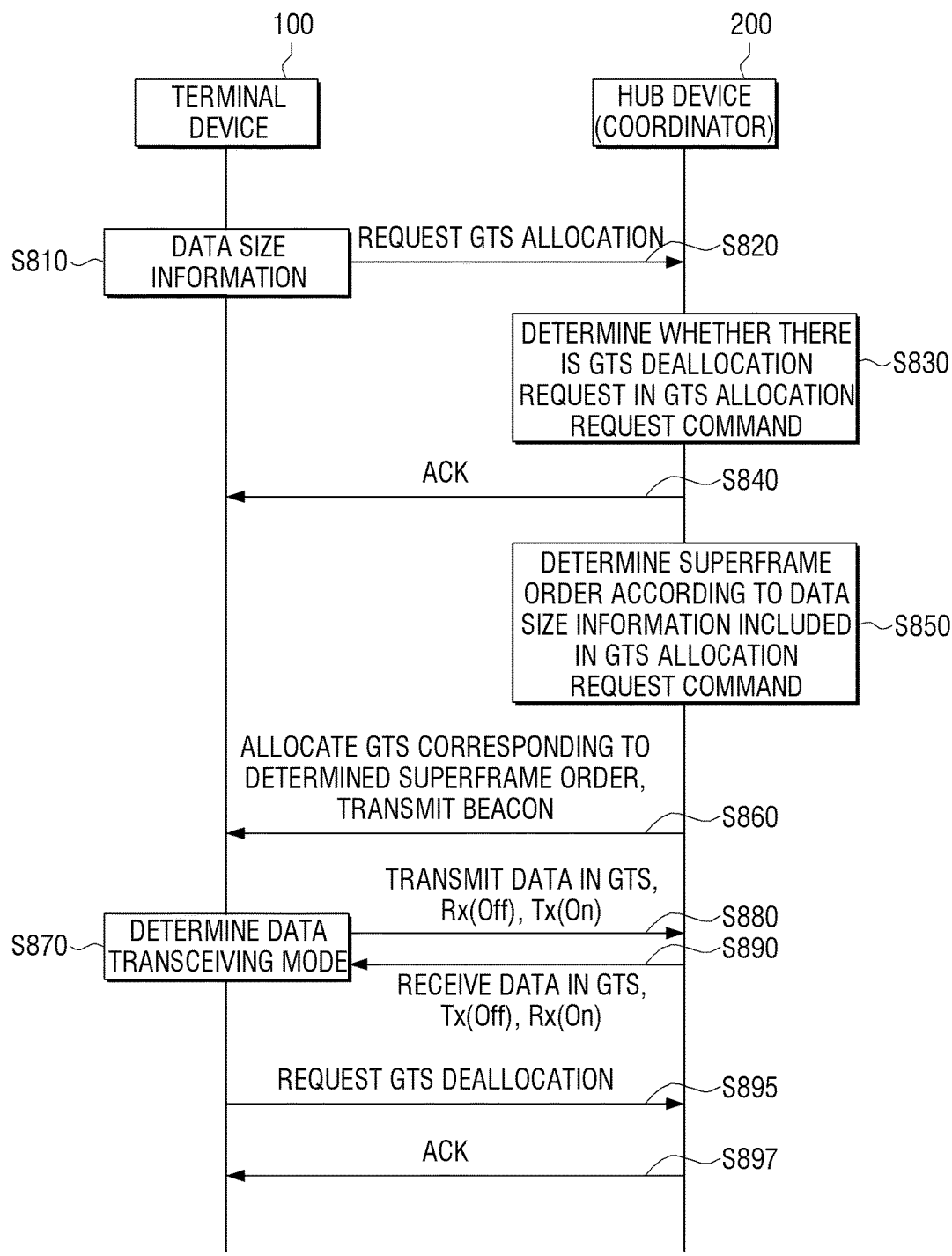
FIG. 8 is a signaling diagram of a data communication method of a hub device and a terminal device, according to an embodiment of the present disclosure.

FIG. 8 is a signaling diagram of a data communication method of a hub device and a terminal device, according to an embodiment of the present disclosure.

In step S810, the terminal device 100 may transmit information regarding a size of data that the terminal device 100 is to transmit to the hub device 200, to the hub device 200 through a GTS characteristics field.

In step S820, the terminal device 100 may transmit a GTS request command including data size information to the hub device 200. The GTS request command may include a GTS allocation request or a GTS deallocation request.

The GTS request may be transmitted to the hub device 200 in a CAP part in an active part of a superframe. Information (I) included in the GTS request may be expressed as a set.

$I=\{(D_i, A_i, T_i, R_i)\}$. Herein, i is $1=<i<=N$. N is the total number of GTS requests in the CAP part. $D_i$ is a data size (bytes) included in GTS requests and the data size is not considered in a GTS deallocation request. $A_i$ may be a most allowed delay time (ms), $T_i$ may be a GTS request arrival time (ms), $R_i$ may be a packet generation rate that the data from the terminal device to become a packet.

In step S830, the hub device 200 may determine whether there is a GTS deallocation request in the GTS request command received from the terminal device 100. For example, the hub device 200 may receive GTS requests from a plurality of terminal devices. The hub device 200 may receive GTS requests in an order that the plurality of terminal devices requested, from the plurality of terminal devices. If at least one GTS deallocation request is included in the plurality of GTS requests received from the plurality of terminal devices, the hub device 200 may first perform a GTS deallocation and then process the other GTS allocation requests. Therefore, the hub device 200 may decrease power consumption and bandwidth waste in the device 100 when it is compared with a method that is processing a GTS allocation request/a GTS deallocation request by an existing first in first out (FIFO) method.

In step S840, the hub device 200 may transmit an ACK which indicates a reception of the GTS request to the terminal device 100.

In step S850, the hub device 200 may determined an SO according to data size information included in the GTS allocation request command.

The SO may be one in a set which has values from 1 to 14 (S)={1, 2, 3, 4, 5, 6, 7, 8, 9, 10, 11, 12, 13, 14}).

The hub device 200 may determine an optimal SO corresponding to a data size of the device 100 by using a performance metric. The performance metric may be expressed like "M=a1* Power efficiency+a2*Delay efficiency+a3* Bandwidth utilization+a4*Throughput efficiency." Herein, $a_1$, $a_2$, $a_3$, and $a_4$ are co-efficient factors and it may be $a_1+a_2+a_3+a_4=1$. The performance metric may be expanded to another performance metric and another coefficient.

Another performance metric, for example, may be power consumption efficiency, allocation delay efficiency, bandwidth use efficiency and throughput efficiency of the hub device 200 when the device 100 transmits size of data that the device 100 is to transmit in operation S630 of FIG. 6. In addition, various capability calculating methods may be used to calculate the performance metric of the hub device 200. Further, various methods for capturing an IEEE 802.15.4 packet may be used to determine a packet generation rate of a data size.

In response to a GTS request being received from each of a plurality of terminal devices, the hub device 200 may allocate a GTS which is not allocated to the terminal devices according to the FIFO order.

The slot length of each device in the current SO may be calculated by using formula SD (Superframe Duration)=aBaseSuperframeDuration*$2^{SO}$. The SO may have a value from 1 to 14.

The hub device 200 may determine an arrival time of data that the plurality of devices are to transmit, to arrive at the hub device 200 based on GTS requests information received from each of the plurality of devices. For example, the time which is required for data to be transmitted may be calculated by the formula data size*2.28+0.64 (ms). The hub device 200 my not accept a GTS allocation request if a required time (t) is greater than the time which is the slot length multiplied by the number of already allocated slots out of seven GTSs (seven is the maximum number of GTSs). For example, the hub device 200 may reject the GTS request if t> (7−# of allocated slot)*slot length (ms).

However, if t=<(7−# of allocated slot)*slot length (ms), the hub device 200 may allocate a GTS to each device in order from a GTS which is not allocated yet.

The hub device 200 may determine an SO value by which efficiency is optimal with a data size of each terminal device and may allocate the GTS length corresponding to the SO value as a GTS, to a terminal device.

In step S860, the hub device 200 may transmit a beacon signal including information that a GTS corresponding to a determined SO is allocated, to the terminal device 100.

In step S870, the terminal device 100 may transceive data to the allocated GTS after receiving a beacon signal and may determine a data transceiving mode based on information regarding the data reception and data transmission. If data is received from the hub device 200 in the allocated GTS part, the terminal device 100 may determine a first mode which is a data receiving mode. In addition, if data is transmitted to the hub device 200 in the allocated GTS part, the terminal device 100 may determine a second mode which is a data transmitting mode.

In step S880, when the terminal device 100 transmits data in a GTS part, the terminal device 100 may turn off an RX and turn on a TX of the communicator of the terminal device 100.

In step S890, when the terminal device 100 receives data in a GTS part, the terminal device 100 may turn on the RX and turn off the TX of the communicator of the terminal device 100.

In step S895, if the terminal device 100 is not to use the allocated GTS further, the terminal device 100 may transmit a GTS deallocation request to the hub device 200.

In step S897, the hub device 200 may transmit a GTS deallocation ACK message to the terminal device 100.

Devices for a wireless network described herein may improve network reliability in a GTS slot and decrease power consumption. In addition, the devices described herein may connect more terminal devices with a network and increase throughput because bandwidth use efficiency increases. In addition, the described methods may be applied in both of the star topology network and the tree topology network.

Figure 9:
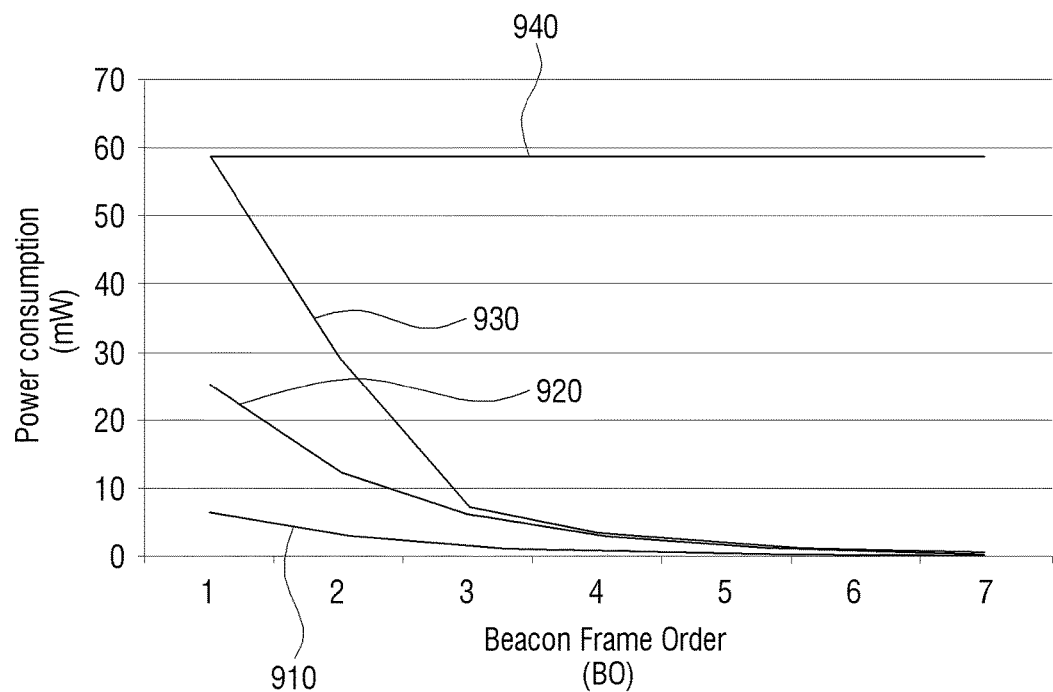
FIG. 9 is a graph illustrating power consumption decreases of a hub device and a terminal device, according to an embodiment of the present disclosure.

FIG. 9 is a graph illustrating power consumption decreases of a hub device and a terminal device, according to an embodiment of the present disclosure.

FIG. 9 is a graph illustrating power consumption according to beacon frame orders when seven sensor devices are connected with the hub device 200 and a size of data that each of the devices are to transmit is 95 bytes. In FIG. 9, power consumption of each of the devices, when an optimal SO is determined, is illustrated as 2 (SO=2) in response to the size of the data being 95 bytes and each of the devices 1, 2, 3, 4, 5, 6, and 7 is allocated with a GTS when SO=2.

A smart home device 940, which uses a non-beacon mode, consumes high power (about 60 mW) in all of the devices 1, 2, 3, 4, 5, 6, and 7, regardless of a beacon frame order (BO) being increased. A smart home device 930, which uses a beacon mode according to the IEEE 802.15.4 communication standard, consumes power which is greater than the powers indicated on a power consumption upper bound line 920 and a power consumption lower bound line 910 of any of the previously described devices.

In other words, even though a BO increases, an active part of a superframe may be increased by allocating the GTS slot length which corresponds to SO value 2 which is optimal for the 95 bytes. The terminal device 100 may consume less power than existing beacon mode device 930 by controlling on/off of the communicator according to a data transceiving mode in the allocated GTS.

Figure 10:
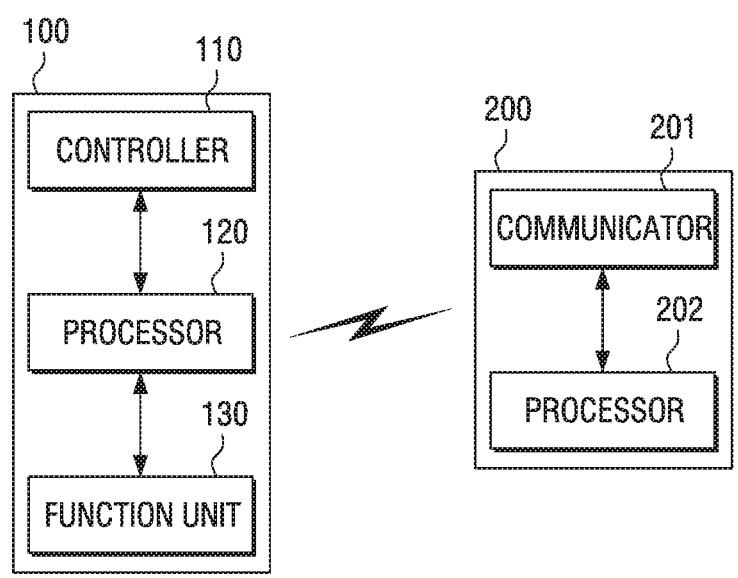
FIG. 10 is a block diagram illustrating a hub device and a terminal device, according to an embodiment of the present disclosure.

FIG. 10 is a block diagram illustrating a hub device and a terminal device, according to an embodiment of the present disclosure.

Referring to FIG. 10, the terminal device 100 includes a communicator 110, a processor 120 and a function unit 130. The terminal device 100 may be various devices which communicate with the hub device 200 on a wireless network by including various sensors.

The communicator 110 may receive a beacon message/signal from the hub device 200, transmit a GTS request command to the hub device 200, and transceive data with the hub device 200 in a GTS allocated according to a control of the processor 120. The communicator 110 may include a wireless communication chip which can carry out a near-field wireless communication via wireless-fidelity (WiFi), Bluetooth and NFC. Even though the IEEE 802.15.4 wireless communication is used, another wireless communication chip may be used.

The function unit 130 may perform a function corresponding to a type of the terminal device 100. For example, various functions that the terminal device 100 may perform via a smart home wireless network of an IoT environment may be included. For example, the terminal device 100 including a sensor which can sense water leakage may include a function for sensing water and notifying a user of the water leakage. If the terminal device 100 includes a sensor for controlling a lamp, the terminal device 100 may include a function for turning on or turning off the lamp automatically in a certain environment or a function of adjusting a level of brightness of the lamp. If the terminal device 100 is embodied in another device, the function unit 130 may perform a function relevant to a type of the embodied device. In addition, the embodied wireless network environment may be various IoT technology based network environments such as in a hospital, a factory, an office and the like rather than a house.

The processor 120 may transmit a GTS allocation request including size information of a device's data that is to be transmitted to the hub device 200, to the hub device 200 through the communicator 110, receive GTS allocation information regarding the device 100 from the hub device 200, determine a transceiving mode of the device 100 based on the received GTS allocation information, and control the communicator 110 to transceive data with the hub device 200 based on the determined transceiving mode.

The GTS allocation request, in response to the data size being smaller than a first value, may be included in a first data size field of a four bit length and, in response to the data size being greater than or equal to the first value, may be included in a second data size field of a two bit length, and the data size field may indicate size information of the data that is to be transmitted to the hub device 200.

The processor 130, in response to a GTS being allocated and data being received from the hub device 200 in the allocated GTS part, may determine a first mode as the transceiving mode and control the communicator to turn on an RX of the communicator 110 and turn off a TX of the communicator 110 in the allocated GTS among GTSs.

The processor 130, in response to a GTS being allocated and data being transmitted to the hub device 200 in the allocated GTS part, may determine a second mode as the transceiving mode and control the communicator to turn off the RX of the communicator 110 and turn on the TX of the communicator 110 in the allocated GTS among GTSs.

The hub device 200 may include a communicator 201 and a processor 202.

The communicator 201 may receive a GTS request command from the terminal device 100 and perform a data communication with the terminal device 100. The communicator 201 may include a wireless communication chip by which a near-field wireless communication may be performed via WiFi, Bluetooth, NFC and the like. The IEEE 802.15.4 wireless communication is used, but another wireless communication chip may be used.

The processor 202 may receive a GTS allocation request including size information of data that the device 100 is to transmit from a plurality of devices (or at least one device), determine SOs regarding the plurality of devices based on the size information of the data received from each of the plurality of devices, and allocate GTSs corresponding to the determined SOs to the plurality of devices.

The processor 202, in response to at least one GTS deallocation request being included in GTS allocation requests received from the plurality of devices, may deallocate a GTS corresponding to the GTS deallocation request and perform a process of allocating a time slot regarding the other GTS allocation requests.

The processor 202, in response to a number of allocated time slots in a GTS being less than a pre-set number, may determine each arrival time of data that the plurality of devices are to transmit, to arrive at the hub device 200 based on the size information of the data.

The processor 202, in response to the data arrival time being less than or equal to a total time of a time slot that is not allocated in the GTS, may execute a GTS allocation regarding a device including the data size information among the plurality of devices.

The processor 202 may determine the data arrival time by using the size information of the data, a GTS allocation delay time, an arrival time of the GTS request and a packet generation rate of the data from the plurality of devices.

The processor 202 may determine an SO regarding the plurality of devices by using energy consumption efficiency, allocation delay efficiency, bandwidth use efficiency and throughput efficiency of the hub device 200.

The processor 202 may transmit allocation information of GTS allocated to each of the plurality of devices and a beacon including a superframe regarding the SO to each of the plurality of devices through the communicator 201.

The terminal device 100 and the hub device 200 may respectively include a memory. The memory may store a program in which various functions controlling each of the terminal device 100 and the hub device 200 and data.

According to various embodiments of the present disclosure, the terminal device 100 for a wireless network and data communication methods may efficiently reduce power consumption of the terminal device 100 by having different power states according to a data transceiving mode in an allocated GTS part which is allocated to a terminal device 100.

In addition, the terminal device 100 for a wireless network and data communication methods may increase the number of devices that are connected with the hub device 200, reduce wasted bandwidth and improve a function of the network by extending network coverage.

The methods described herein may be embodied as codes in a non-transitory computer-readable recording medium having stored thereon executable instructions. The non-transitory computer-readable recording medium includes all types of recording devices in which computer system-readable data is stored. Examples of the non-transitory computer-readable recording medium are a read-only memory (ROM), a random-access memory (RAM), a CD-ROM, a magnetic tape, a floppy disk and an optical data storage device. The non-transitory computer-readable recording medium may be disposed in a computer system which is connected via a network so that computer readable codes can be stored and executed in a distribution method. In addition, methods described herein may be recorded as a computer program transmitted through a non-transitory computer-readable transmitting medium such as a carrier wave and may be received and embodied in a general purposed or a specially purposed digital computer. Further, at least one unit of the devices may include a circuit, a processor, a microprocessor, etc. and the at least one unit may execute a computer program stored in the non-transitory computer-readable recording medium.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of data communication by a hub device for a wireless communication system, the method comprising:
   receiving guaranteed time slot (GTS) allocation requests including size information of data from a plurality of devices in operable communication with the hub device;
   determining a superframe order (SO) regarding the plurality of devices based on the size information of the data received therefrom; and
   allocating a GTS corresponding to the determined SO as a GTS of the plurality of devices,
   wherein the GTS allocation requests, in response to a data size of the data being smaller than a first value, are included in a first data size field and, in response to the data size being greater than or equal to the first value, are included in a second data size field, and the first data size field and the second data size field are a data size field which indicates size information of data that each of the plurality of devices transmits to the hub device.

2. The method as claimed in claim 1, wherein allocating the GTS comprises:
   in response to a GTS deallocation request being included in at least one of the GTS allocation requests received from the plurality of devices, executing a GTS deallocation corresponding to the GTS deallocation request and allocating a time slot regarding at least one other of the GTS allocation requests.

3. The method as claimed in claim 1,
   wherein determining the SO comprises:
   in response to a number of allocated time slots in a GTS being less than a pre-set number, determining, based on the size information of the data, each arrival time of data that the plurality of devices transmit to the hub device.

4. The method as claimed in claim 3, wherein allocating the GTS further comprises:
   in response to the time which is required for the data to arrive being less than or equal to a total time of a time slot that is not allocated in the GTS, executing a GTS allocation regarding a device including the data size information among the plurality of devices.

5. The method as claimed in claim 3, wherein determining the arrival time comprises determining the data arrival time using the size information of the data, a GTS allocation delay time, an arrival time of the GTS request, and a packet generation rate of the data from the plurality of devices.

6. The method as claimed in claim 1, wherein determining the SO comprises determining an SO regarding the plurality of devices by using energy consumption efficiency, allocation delay efficiency, bandwidth use efficiency, and throughput efficiency of the hub device.

7. The method as claimed in claim 1, further comprising transmitting, to each of the plurality of devices, GTS allocation information allocated to the plurality of devices and a beacon signal including an SO value.

8. A hub device for a wireless communication system, the hub device comprising:
   a communicator configured to transceive data with a plurality of devices; and
   a processor configured to receive guaranteed time slot (GTS) allocation requests including size information of data from the plurality of devices, determine a superframe order (SO) regarding the plurality of devices based on the size information of the data received therefrom, and allocate a GTS corresponding to the determined SO as a GTS of the plurality of devices, wherein the GTS allocation requests, in response to a data size of the data being smaller than a first value, are included in a first data size field and, in response to the data size being greater than or equal to the first value, are included in a second data size field, and the first data size field and the second data size field are a data size field which indicates size information of data that each of the plurality of devices transmits.

9. The hub device as claimed in claim 8, wherein the processor, in response to a GTS deallocation request being included in at least one of the GTS allocation requests received from the plurality of devices, is further configured to execute a GTS deallocation corresponding to the GTS deallocation request and allocate a time slot regarding at least one other of the GTS allocation requests.

10. The hub device as claimed in claim 8, wherein the processor, in response to a number of allocated time slots in a GTS being less than a pre-set number, is further configured to determine each arrival time of data that the plurality of devices transmit to the hub device based on the size information of the data.

11. The hub device as claimed in claim 10, wherein the processor, in response to the time which is required for the data to arrive being less than or equal to a total time of a time slot that is not allocated in the GTS, is further configured to execute a GTS allocation regarding a device including the data size information among the plurality of devices.

12. The hub device as claimed in claim 10, wherein the processor is further configured to determine the data arrival time by using the size information of the data, a GTS allocation delay time, an arrival time of the GTS request, and a packet generation rate of the data from the plurality of devices.

13. The hub device as claimed in claim 10, wherein the processor is further configured to determine an SO regarding the plurality of devices by using energy consumption efficiency, allocation delay efficiency, bandwidth use efficiency, and throughput efficiency of the hub device.

14. The hub device as claimed in claim 10, wherein the processor is further configured to transmit GTS allocation information allocated to the plurality of devices and a beacon signal including an SO value to each of the plurality of devices through the communicator.

15. A device for a wireless network system, the device comprising:
   a communicator configured to transceive data with a hub device; and
   a processor configured to control the communicator to transmit a guaranteed time slot (GTS) allocation request including data size information to the hub device, receive GTS allocation information including the data size information regarding the device from the hub device, determine a transceiving mode of the device based on the GTS allocation information and the data size information and transceive data with the hub device based on the determined transceiving mod;
   wherein the GTS allocation request, in response to a data size of the data being smaller than a first value, is included in a first data size field and, in response to the data size being greater than or equal to the first value, is included in a second data size field, and the first data size field and the second data size field are a data size field which indicates size information of data that is to be transmitted to the hub device.

16. The device as claimed in claim 15, wherein the processor, in response to the GTS being allocated and data being received from the hub device, is further configured to determine a first mode as the transceiving mode and control the communicator to turn on a receiver (RX) of the communicator and turn off a transmitter (TX) of the communicator in an allocated time slot of the GTS.

17. The device as claimed in claim 15, wherein the processor, in response to the GTS being allocated and data being transmitted to the hub device, is further configured to determine a second mode as the transceiving mode and control the communicator to turn off the RX of the communicator and turn on the TX of the communicator in an allocated time slot of the GTS.

* * * * *